(12) United States Patent
Kojima

(10) Patent No.: US 8,182,066 B2
(45) Date of Patent: May 22, 2012

(54) LIQUID BODY DISCHARGE DEVICE AND METHOD FOR DISCHARGING LIQUID BODY

(75) Inventor: Kenji Kojima, Suwa (JP)

(73) Assignee: Seiko Epson Corporation (JP)

( * ) Notice: Subject to any disclaimer, the term of this patent is extended or adjusted under 35 U.S.C. 154(b) by 466 days.

(21) Appl. No.: 12/352,039

(22) Filed: Jan. 12, 2009

(65) Prior Publication Data

US 2009/0184999 A1    Jul. 23, 2009

(30) Foreign Application Priority Data

Jan. 22, 2008   (JP) .................................. 2008-011213

(51) Int. Cl.
*B41J 23/00*   (2006.01)
*B41J 2/21*   (2006.01)

(52) U.S. Cl. ........................................... 347/37; 347/43

(58) Field of Classification Search ................... 347/37, 347/40, 43, 101
See application file for complete search history.

(56) References Cited

U.S. PATENT DOCUMENTS

| | | | |
|---|---|---|---|
| 5,428,375 A * | 6/1995 | Simon et al. .................... | 347/12 |
| 6,244,688 B1 * | 6/2001 | Hickman ......................... | 347/43 |
| 7,182,815 B2 | 2/2007 | Katagami et al. | |
| 2006/0103707 A1 * | 5/2006 | Askeland et al. .............. | 347/101 |
| 2006/0146379 A1 | 7/2006 | Katagami et al. | |
| 2009/0122110 A1 | 5/2009 | Yoshioka | |

FOREIGN PATENT DOCUMENTS

| | | |
|---|---|---|
| JP | 2002-273868 | 9/2002 |
| JP | 2002-273869 | 9/2002 |
| JP | 2006-346575 | 12/2006 |
| JP | 2007-007544 | 1/2007 |
| JP | 2007-136330 | 6/2007 |

* cited by examiner

*Primary Examiner* — Geoffrey Mruk

(74) *Attorney, Agent, or Firm* — Harness, Dickey & Pierce, P.L.C.

(57) ABSTRACT

A liquid body discharge device includes a plurality of nozzles for discharging a liquid body to a liquid body discharged region of a substrate, and a plurality of heads moving along a moving path and each including the plurality of nozzles. Among the plurality of heads, at least one of the plurality of heads includes the plurality of nozzles aligned in a first alignment direction, while a rest of the plurality of heads includes the plurality of nozzles aligned in a second alignment direction that is different from the first alignment direction. The liquid body is discharged to the liquid body discharged region of the substrate by moving one of the substrate and at least one of the plurality of heads.

3 Claims, 11 Drawing Sheets

LIQUID BODY DISCHARGE DEVICE AND METHOD FOR DISCHARGING LIQUID BODY

BACKGROUND

1. Technical Field

The present invention relates to a liquid body discharge device and a method for discharging a liquid body.

2. Related Art

There have been liquid body discharge devices that discharge liquid bodies such as functional liquids and ink to substrates made of glass, ceramic, resin, or silicon to form (also referred to as "draw") predetermined patterns (also referred to as "drawing patterns"). One of such devices includes a head in which a discharge mechanism and a circuit substrate to control the discharge mechanism are built. The discharge mechanism discharges a liquid body by applying a pressure to the liquid body in a pressure chamber provided in a middle of a flow path through which the liquid flows by using an electrostrictive property of a piezoelectric element or thermal energy. The liquid body is discharged from a nozzle that is provided to the head and located at the end of the flow path. Typically, a plurality of nozzles are formed as a nozzle group. The nozzles are aligned in a substantially straight line as an alignment direction with a predetermined nozzle distance (pitch).

When color filters are formed on a substrate by drawing patterns using such a liquid body discharge device, there is a case where the drawing patterns of drawing regions of color pixels, i.e., liquid body discharged regions to which color liquid bodies of R (red), G (green), and B (blue) are discharged, are different depending on the color filters. When a plurality of color filters corresponding to different display sizes from one another are formed on a single substrate, the color filters may have different drawing patterns. For example, the color pixels corresponding to R, G, and B each having a rectangular shape with a longitudinal side are employed, the longitudinal direction of the color pixel included in one drawing pattern is orthogonal to the longitudinal direction of the color pixel included in another drawing pattern. In this regard, a pixel pitch between the color pixels adjacent to each other in the longitudinal direction of the pixel is different from that in a direction orthogonal to the longitudinal direction, i.e., the pitch in the direction orthogonal to the longitudinal direction is shorter than that in the longitudinal direction. In this case, when the color pixels are formed in the plurality of color filters by discharging respective color liquids from nozzles formed in the heads so as to be aligned in predetermined alignment directions, the following problem may occur. If the alignment direction of the nozzles is substantially in parallel with the longitudinal direction of each color pixel, each color pixel can be formed. In contrast, if the alignment direction of the nozzles is substantially orthogonal to the longitudinal direction of each color pixel, some pixels are not formed because the pixel pitch is shorter in the alignment direction of the nozzles.

To cope with such a problem, the alignment direction of the nozzles needs to be optimized in a direction based on each drawing pattern. For example, JP-A-2002-273868 discloses a technique in which an alignment direction of nozzles (a nozzle group) is rotated to an angle suitable for the pixel pitch of each color pixel to draw patterns.

However, when the alignment direction of the nozzles is rotated as described above, the head needs to be provided with a rotating mechanism to rotate the nozzle group. Therefore, the head becomes heavy due to the weight of the mechanism, resulting in a problem in that the head is not easy to be replaced. In addition, another problem arises in that the position of the nozzle group after being rotated is varied due to uneven rotations or backlashes occur in no small part of rotating mechanisms, resulting in the liquid bodies being not discharged at desired positions.

SUMMARY

An advantage of the present invention is to provide a liquid body discharge device and a method for discharging a liquid body that can draw patterns different from each other without employing a rotating mechanism to rotate an alignment direction of nozzles.

A liquid body discharge device includes a plurality of nozzles for discharging a liquid body to a liquid body discharged region of a substrate, and a plurality of heads moving along a moving path and each including the plurality of nozzles. Among the plurality of heads, at least one of the plurality of heads includes the plurality of nozzles aligned in a first alignment direction, while a rest of the plurality of heads includes the plurality of nozzles aligned in a second alignment direction that is different from the first alignment direction. The liquid body is discharged to the liquid body discharged region of the substrate by moving one of the substrate and at least one of the plurality of heads.

This structure allows the plurality of heads moving in one moving path to have the nozzles aligned in different directions. Then, when the liquid body is discharged to the liquid body discharged region from the nozzles, the nozzles to discharge the liquid body to the liquid body discharged region are changed by moving each of the heads along the moving path so as to employ the nozzles aligned in the different alignment direction. For example, when a color filter has drawing patterns different from each other in a shape of color pixels or the like, the liquid body can be discharged from the nozzles aligned in an alignment direction suitable for a desired drawing pattern. Thus, the device can draw the drawing patterns different from each other without providing a rotating mechanism to rotate the alignment direction of the nozzles to the head. As a result, the head can avoid being heavy and positioning shifts of the nozzles caused by a rotation is prevented from occurring.

The liquid body discharge device described above may further include a head moving unit that moves the at least one of the plurality of heads in a first moving direction along the moving path in the liquid body discharged region in a case where the liquid body is discharged from the plurality of nozzles provided to the at least one of the plurality of heads, and a substrate moving unit that moves the substrate in a second moving direction that is different from the first moving direction in the liquid body discharged region in a case where the liquid body is discharged from the plurality of nozzles provided to the rest of the plurality of heads.

In this case, the liquid body can be discharged to the liquid body discharged region from the nozzles aligned in one alignment direction in the first moving direction and from the nozzles aligned in the other alignment direction in the second moving direction. As a result, when a color filter has drawing patterns different from each other in a shape of color pixels or the like, the liquid body can be discharged from the nozzles aligned in an alignment direction suitable for a desired drawing pattern between the nozzles moving in the first moving direction and the nozzles moving in the second moving direction, for example. Thus, the alignment direction of the nozzles does not need to be rotated in one head, and a rotating mechanism does not need to be provided. As a result, the head can avoid being heavy and positioning shifts of the nozzles caused by a rotation is prevented from occurring.

In the liquid body discharge device above, in a case where the at least one of the plurality of heads is formed in a plural number, the heads may be apposed in a direction orthogonal to the first moving direction.

In this case, the plurality of heads that move in the first moving direction are apposed in the direction orthogonal to the first moving direction. Therefore, when the plurality of heads apposed in the orthogonal direction move in the first moving direction, an area in which the liquid body is discharged from the nozzles in the liquid body discharged region is widened. Accordingly, the area of the liquid body discharged region covered by the one time movement of the heads becomes larger. As a result, the number of head movements to discharge the liquid body to all the liquid body discharged region can be reduced, while the head avoids becoming heavy and positioning shifts of the nozzles caused by a rotation is prevented from occurring.

In the liquid body discharge device above, the first alignment direction of the plurality of nozzles and the second alignment direction of the plurality of nozzles may be substantially orthogonal to each other.

Since the nozzles are aligned in a nearly orthogonal relation, the possibility of existence of the nozzles having a preferable alignment direction depending on a shape of the liquid discharged regions becomes high.

In the liquid body discharge device above, the first moving direction and the second moving direction may be substantially orthogonal to each other.

Generally, the shape of the liquid body discharged region is often a rectangle having sides making a right angle. Therefore, if the first and second moving directions are substantially orthogonal to each other as above, the liquid body can be discharged from the nozzles aligned in a direction suitable for the shape of the liquid body discharged region.

A method for discharging a liquid body includes: (a) moving at least one of a plurality of heads moving along a moving path in a first moving direction in a liquid body discharged region of a substrate in a case where a liquid body is discharged from a plurality of nozzles provided to the at least one of the plurality of heads to the liquid body discharged region; and (b) moving the substrate in a second moving direction in a liquid body discharged region of the substrate in a case where the liquid body is discharged from a plurality of nozzles provided to a rest of the plurality of heads. The plurality of nozzles provided to the at least one of the plurality of heads are aligned in a first alignment direction, while the plurality of nozzles provided to the rest of the plurality of heads are aligned in a second alignment direction that is different from the first alignment direction.

According to the method, in the liquid body discharged region, the heads move in the first moving direction while the substrate moves in the second moving direction. This enables the heads having the nozzles aligned in different alignment directions from each other to discharge the liquid body to the liquid body discharged region. As a result, when a color filter has drawing patterns different from each other in a shape of color pixels or the like, the liquid body can be discharged from the nozzles aligned in an alignment direction suitable for a desired drawing pattern, for example.

In the method for discharging a liquid body above, a total area of the liquid body discharged region in step (a) may be smaller than a total area of the liquid body discharged region in step (b).

There may be a case where the heads take longer time than the substrate to move in the liquid body discharged region. This is because of the following reason. There is a high possibility that the discharged position accuracy of the liquid body to the liquid body discharged region is worse when the head moves rather than the substrate moves since the head is heavy or the accuracy is affected by vibrations caused by the movement of the head. To avoid the problem, the moving speed of the substrate is set lower than that of the head. In such a case, if the total area of the liquid body discharged region to which the liquid body is discharged by moving the head is set to be smaller than that to which the liquid body is discharged by moving the substrate, the time taken to discharge the liquid body to all the liquid body discharged regions can be suppressed from increasing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
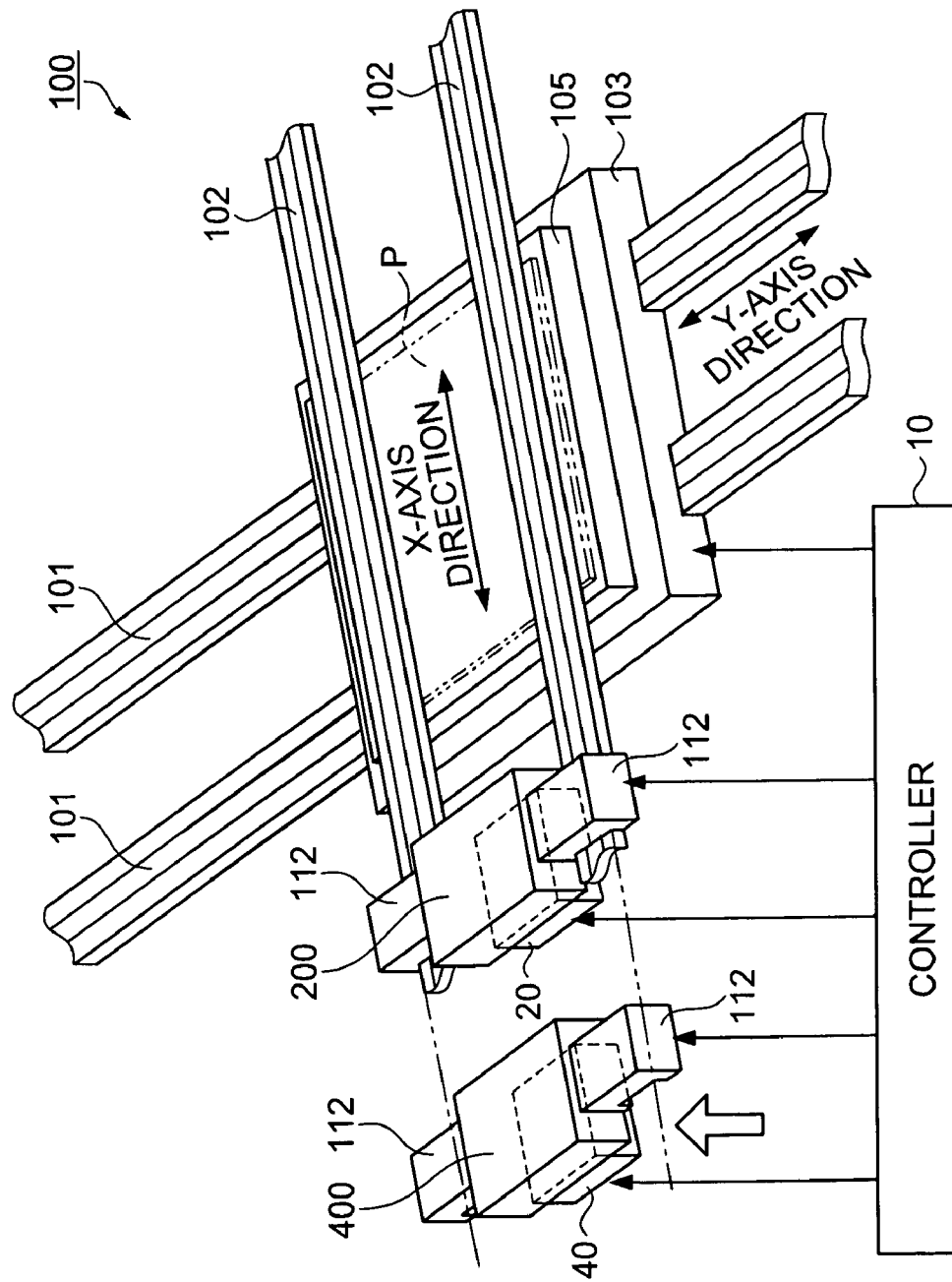
FIG. 1 is a diagram illustrating a schematic configuration of a liquid body discharge device according to a first embodiment of the invention.

An embodiment of the invention will now be described below. FIG. 1 is a perspective view illustrating a schematic configuration of a liquid body discharge device 100 of the embodiment. The liquid body discharge device 100 of the embodiment is a device for forming a color filter by discharging color liquid bodies in red (R), green (G), and blue (B) respectively on color pixels formed on a substrate P. The substrate P is an object to be discharged and the color pixels are regions to be discharged.

As shown in FIG. 1, the liquid body discharge device 100 is provided with a pair of guide rails 101 that is linearly disposed, and a movable stage 103 moving in a linear axis direction (i.e. a Y-axis direction in the embodiment) by air sliders and linear motors (not illustrated) provided inside the guide rails 101. On the movable stage 103, a stage 105 to place the substrate P thereon is formed. The stage 105 is adapted to fix the substrate P by suction.

Above the stage 105, a pair of guide rails 102 is formed apart from the stage 105 with a predetermined distance so as to be orthogonal to the guide rails 101, i.e., disposed at a side adjacent to one surface of the stage 105 having the other surface which is opposite to the one surface, facing the movable stage 103. In the embodiment, a direction from the one surface of the stage 105 to the pair of the guide rails 102 is referred to as an upper direction while a direction opposite to the upper direction is referred to as a lower direction. Therefore, the guide rails 102 are formed to have a linear axis direction (i.e. an X-axis direction in the embodiment).

The liquid body discharge device 100 is provided with a carriage 200 and a carriage 400 that move along the pair of the guide rails 102. That is, each of the carriages 200 and 400 includes carriage moving stages 112 at both sides so as to be movable along the X-axis direction by air sliders and linear motors (not illustrated) provided inside the guide rails 102.

Further, the carriage 200 includes a nozzle head 20 while the carriage 400 includes a nozzle head 40. Each of the nozzle heads 20 and 40 includes a plurality of nozzles formed therein in a predetermined alignment direction at a lower side thereof so as to discharge color liquid bodies, and a discharge mechanism allowing each nozzle to discharge one of the color liquid bodies. Then, the color liquid bodies having been supplied to the carriages 200 and 400 from a liquid body supplying mechanism (not illustrated) are respectively supplied to the nozzle heads 20 and 40 via flow paths (not illustrated) and discharged from the nozzles as droplets by the discharge mechanism formed at each of the nozzles. Each of the nozzle heads 20 and 40 in the embodiment exemplarily corresponds to "head" described in Claims.

Figure 2:
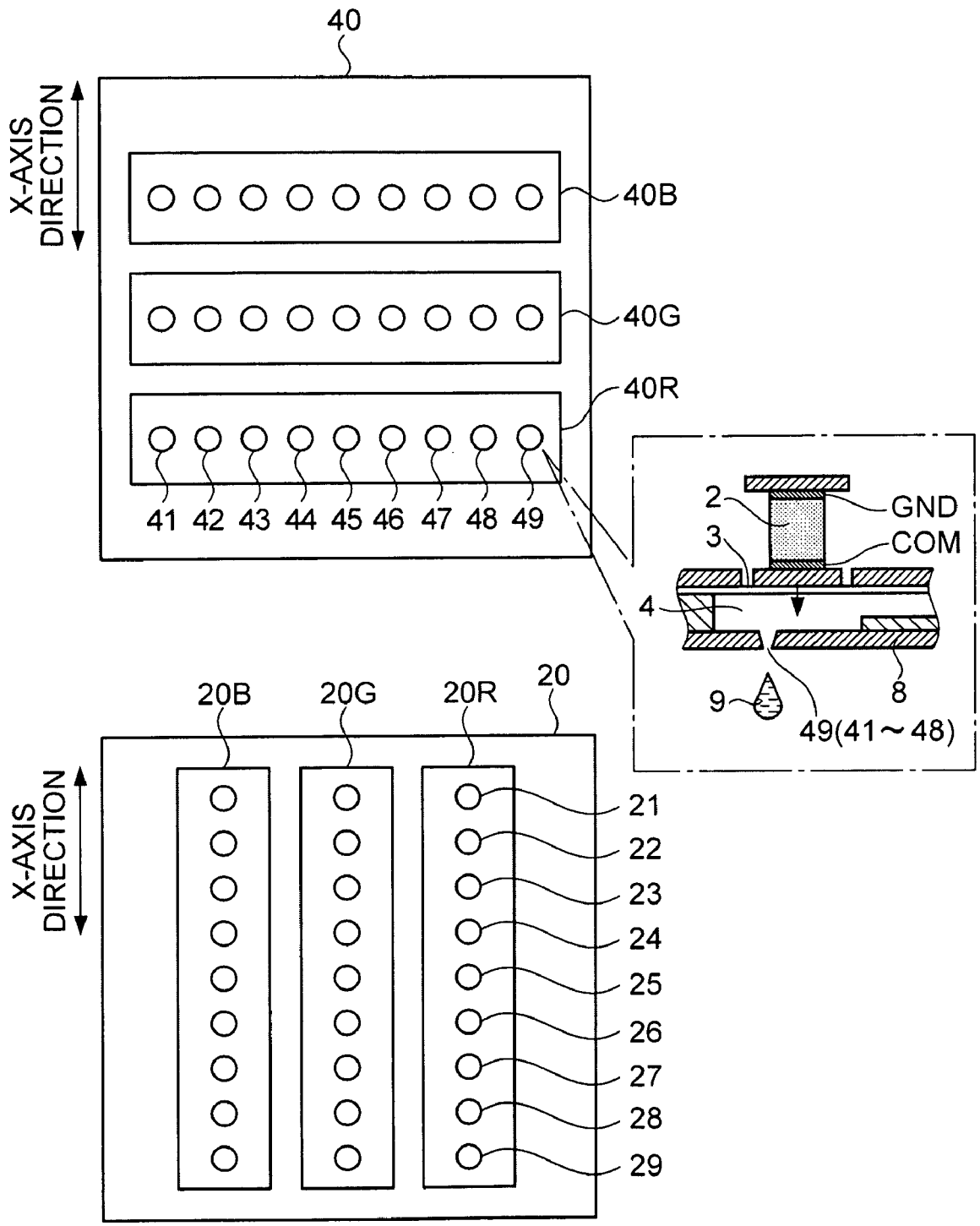
FIG. 2 is a diagram schematically illustrating alignment conditions of nozzles formed in nozzle heads.

In the liquid body discharge device 100 in the embodiment, the alignment direction of the nozzles formed in the nozzle head 20 is set so as to be different from the alignment direction of the nozzles formed in the nozzle head 40. This will be described with reference to FIG. 2. FIG. 2 is a diagram schematically illustrating alignment conditions of the nozzles formed in the nozzle heads 20 and 40 in a view from the lower side as indicated by an outlined arrow in FIG. 1.

In the embodiment, as illustrated, the nozzle head 20 is provided with nozzle groups 20R, 20G, and 20B for respectively discharging liquid bodies corresponding to R, G, and B. Further, each of the nozzle groups 20R, 20G, and 20B includes a nozzle row in which nozzles 21 to 29, i.e., 9 nozzles, are aligned in a nearly linear line. The alignment direction of the nozzles coincides with the X-axis direction.

The nozzle head 40 is, as illustrated, provided with nozzle groups 40R, 40G, and 40B, similarly to the nozzle head 20, for respectively discharging liquid bodies corresponding to R, G, and B. Further, each of the nozzle groups 40R, 40G, and 40B includes a nozzle row in which nozzles 41 to 49, i.e., 9 nozzles, are aligned in a nearly linear line. However, the alignment direction of the nozzles is orthogonal to the X-axis direction unlike that of the nozzles in the nozzle head 20.

Each of the nozzles formed in the nozzle heads 20 and 40 is provided with the discharge mechanism, as described above, so as to discharge a predetermined amount of the liquid body from the nozzle as a droplet by generating pressure to the liquid body in the nozzle head. The discharge mechanisms for all the nozzles have similar configurations.

The discharge mechanism has a configuration as shown in a balloon in FIG. 2 in the embodiment, and includes a piezoelectric element 2 provided as an actuator. When a predetermined voltage waveform is applied between an electrode COM and an electrode GND that are disposed at opposite ends of the piezoelectric element 2, the piezoelectric element 2 is deformed and contracted or deformed and extended by an electrostrictive property, resulting in pressurizing a liquid body in a pressure chamber 4 formed in the middle of a liquid body flow path. As a result, the pressurized liquid body is discharged as a droplet 9 from the nozzle 49 (or 41 to 48) formed in a bottom member 8 of the nozzle head. Alternatively, a so-called thermal system using a heating element as an actuator can be also employed as the discharge mechanism.

In the embodiment, the nozzle group having 9 nozzles is introduced for simplifying the explanation. However, in fact, several tens to several hundreds of nozzles are respectively formed at predetermined pitches. Further, the nozzle group may include a plurality of nozzle rows such as two nozzle rows. In a case of having two nozzle rows, the nozzles are formed in a position that is shifted by a half pitch from one nozzle row from another so as to form a zigzag alignment, for example. Further, a plurality of nozzle groups may be formed corresponding to each of the color liquid bodies.

Referring back to FIG. 1, the liquid body discharge device 100 is provided with a controller 10. The controller 10 controls: the movement of the movable stage 103 in the Y-axis direction, i.e., the movement of the substrate P in the Y-axis direction; the movement of the carriage moving stages 112 provided to the carriages 200 and 400 in the X-axis direction, i.e., the movement of the carriages 200 and 400 in the X-axis direction; and the driving of the discharge mechanisms formed in the nozzle heads 20 and 40, i.e., the discharging the liquid body, by using data of a drawing pattern to be drawn on the substrate P. In the embodiment, the drawing pattern data is coordinate data in which each of color pixels of a color filter is defined as a coordinate position on the substrate P.

Figure 3:
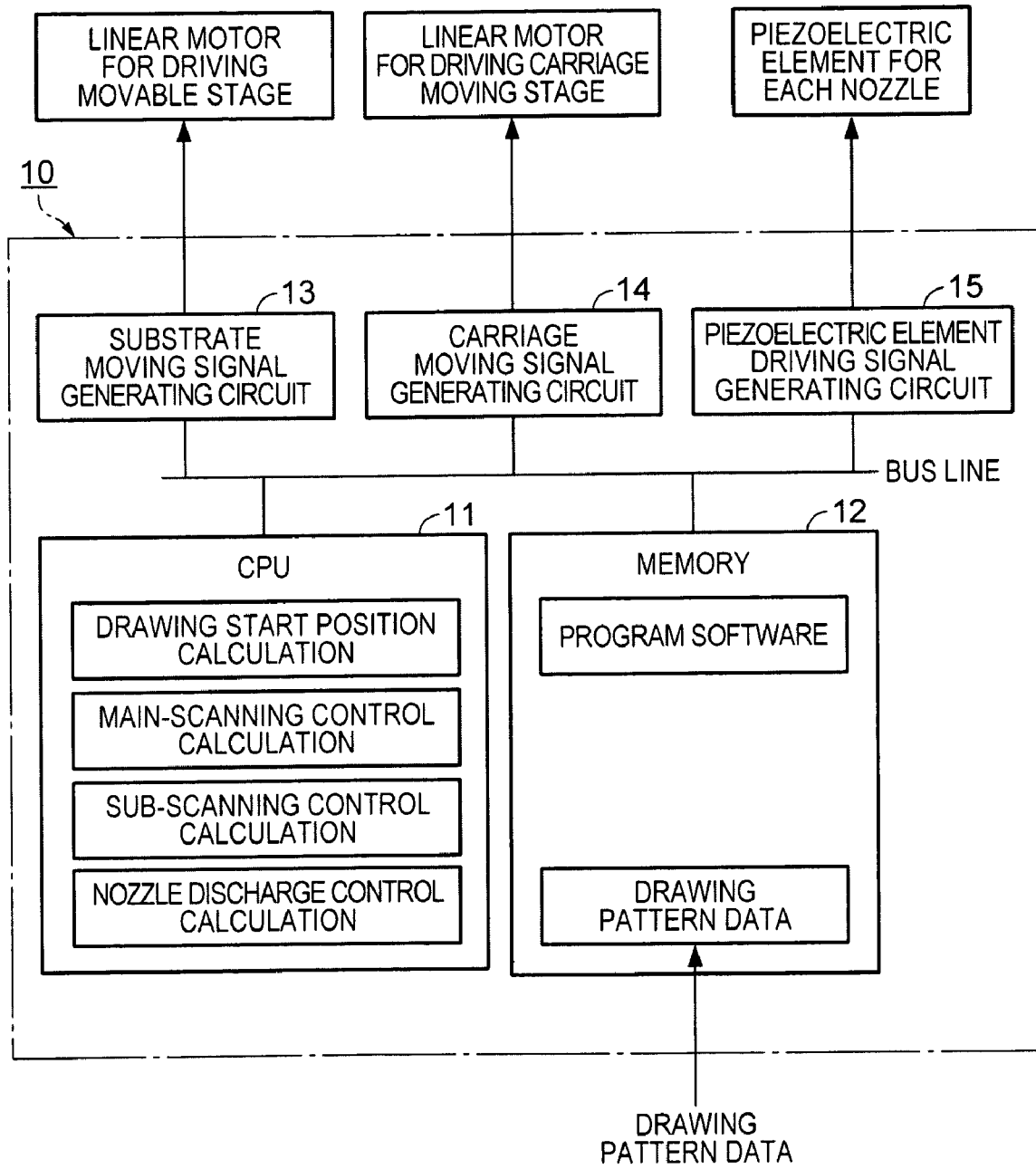
FIG. 3 is a block diagram for explaining a function of a controller.

Next, the controller 10 will be described with reference to a block diagram shown in FIG. 3. The controller 10 includes, as shown in FIG. 3, a CPU 11, a memory 12, a substrate moving signal generating circuit 13, a carriage moving signal generating circuit 14, and a piezoelectric element driving signal generating circuit 15 that are coupled to each other through a bus line. Output signals of the substrate moving signal generating circuit 13, the carriage moving signal generating circuit 14, and the piezoelectric element driving signal generating circuit 15 are outputted as predetermined voltage signals respectively to linear motors for driving a movable stage, linear motors for driving a carriage moving stage, and a piezoelectric element for each nozzle, through an interface as necessary.

The CPU 11 executes a drawing start position calculation, a main-scanning control calculation, a sub-scanning control calculation, and a nozzle discharge control calculation in order to form a predetermined drawing pattern on the substrate P by discharging each of the color liquid bodies based on drawing pattern data that is inputted to the controller 10 and stored in the memory 12 through an interface (not illustrated) or the like.

Here, the main-scanning means a movement while nozzles discharge liquid bodies in a path where the substrate P and the nozzles are relatively moved. A main-scanning direction may be a moving direction of the substrate (the Y-axis direction) or a moving direction of the carriages (the X-axis direction) depending on a drawing pattern. The sub-scanning means a movement without discharging liquid bodies from nozzles after one main-scanning and before next main-scanning in a path where the substrate P and the nozzles are relatively moved. A sub-scanning direction may be the moving direction of the substrate (the Y-axis direction) or the moving direction of the carriages (the X-axis direction) depending on a drawing pattern.

The CPU 11 controls the substrate moving signal generating circuit 13 and the carriage moving signal generating circuit 14 based on the calculated control data of the main-scanning and the sub-scanning, thus generating and outputting a driving signal for each of the linear motors. Concurrently, the CPU 11 controls the piezoelectric element driving signal generating circuit 15 based on the calculated control data to discharge each color liquid body from nozzles during the main-scanning so as to output driving signals for the piezoelectric elements.

Accordingly, the liquid body discharge device 100 of the embodiment allows the nozzle groups 20R, 20G, and 20B, or the nozzle groups 40R, 40G, and 40B to relatively move with respect to the substrate P by moving the movable stage 103 and the carriage moving stage 112, while controlling ON (to discharge) and OFF (not to discharge) states of the liquid body discharge by the discharge mechanism formed at each of the nozzles. As a result, the liquid body is discharged at a position along a main-scanning trajectory of the main-scanning of the nozzles 21 to 29 or the nozzles 41 to 49 on the substrate P, thus drawing a predetermined pattern. In each of the nozzle groups, a few nozzles positioned at an end may not be used in view of the difference in discharging characteristics from other nozzles.

Figure 4:
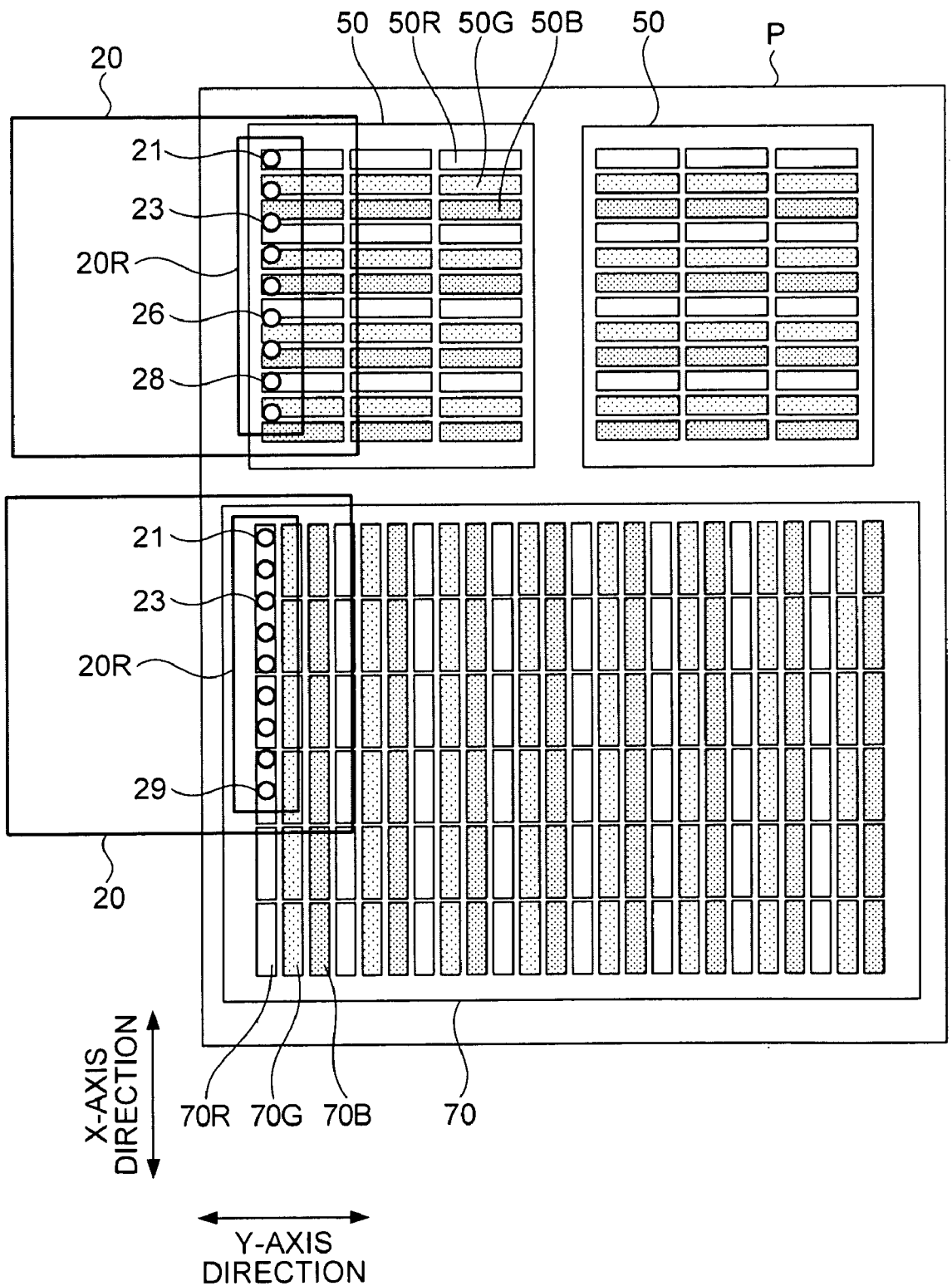
FIG. 4 is a diagram for explaining a method for forming a color filter on a substrate P according to the embodiment.
Figure 5:
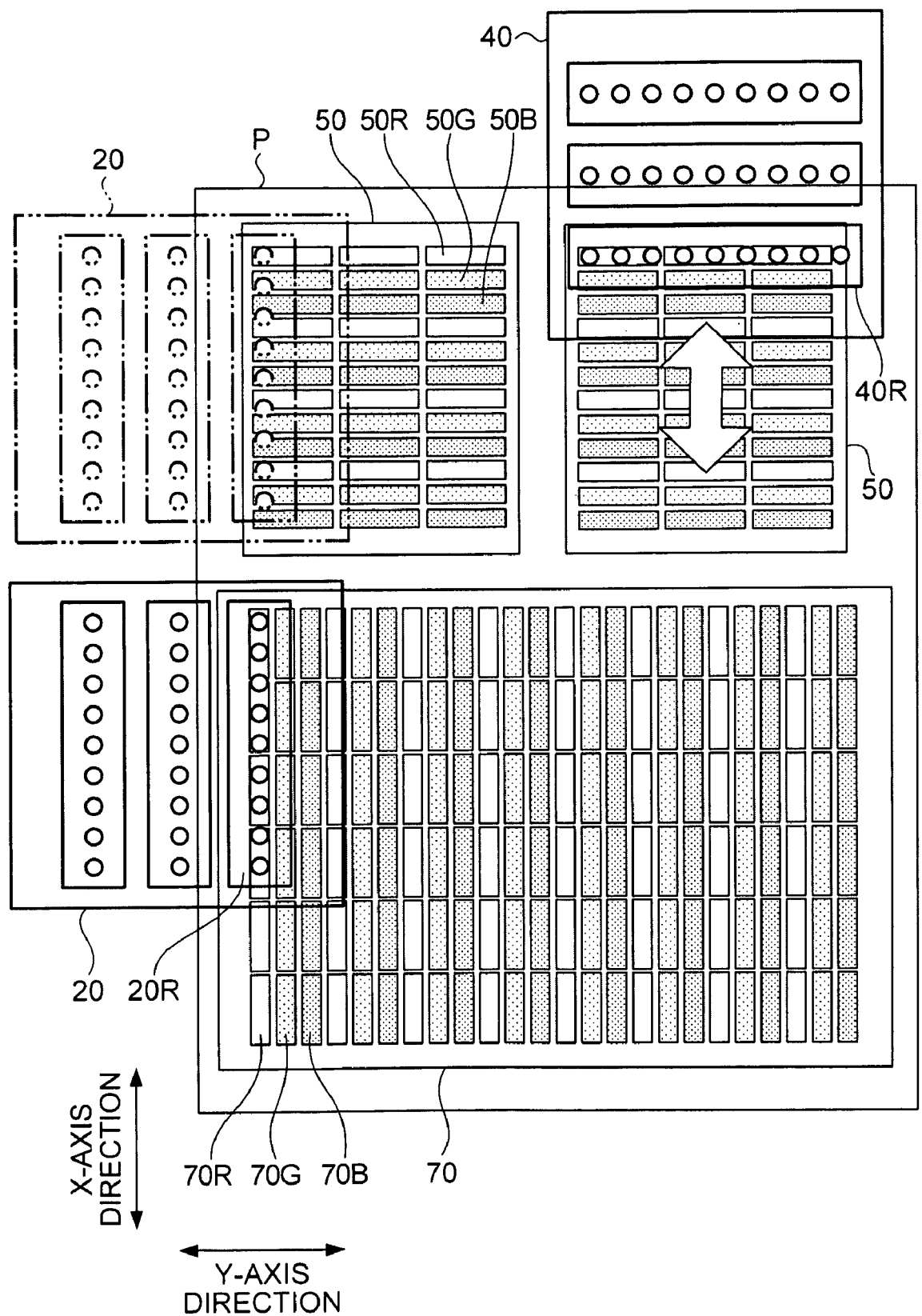
FIG. 5 is a diagram for explaining a method for forming a color filter on the substrate P according to the embodiment.

Subsequently, in a case of forming a different drawing pattern on the substrate P, a drawing process by the liquid body discharge device 100 of the embodiment will be described. Prior to this, an outline of the process is described with reference to FIGS. 4 and 5. FIGS. 4 and 5 are top views of the substrate P and explaining a relation of liquid body discharged regions of respective colors formed on the substrate P and the nozzle heads. Here, the nozzle heads are shown in a transparent view. In addition, the sizes of the liquid body discharged regions of the respective colors and the nozzle heads are exaggeratingly illustrated for explanatory reasons.

FIG. 4 shows a state in which a color filter 70 for a large sized screen and two pieces of color filters 50 each for a small sized screen are formed on the substrate P. The color filter 70 has a drawing pattern in which liquid body discharged regions (color pixels) having a rectangular shape with a longitudinal side extending in the X-axis direction are formed in a matrix. The liquid body discharged regions are partitioned by banks or the like made of resin and form regions 70R, 70G, and 70B along the Y-axis direction in a stripe arrangement. In the regions, the respective color liquid bodies R, G, and B are repeatedly and subsequently discharged. On the other hand, the color filter 50 has a drawing pattern in which liquid body discharged regions having a rectangular shape with a longitudinal side extending in the Y-axis direction are formed in a matrix. The liquid body discharged regions are partitioned by banks or the like made of resin and form regions 50R, 50G, and 50B along the X-axis direction, in a stripe arrangement. In the regions, the respective color liquid bodies R, G, and B are repeatedly and subsequently discharged.

In the embodiment, the Y-axis direction is orthogonal to the X-axis direction. Therefore, the color filter 50 and the color filter 70 have different drawing patterns in the longitudinal direction of the rectangular partitioned region from each other. That is, the longitudinal direction of the liquid body discharged region of the color filter 50 and the longitudinal direction of the liquid body discharged region of the color filter 70 are orthogonal. In a case where a color filter for a large-sized screen and another color filter for a small-sized screen are concurrently drawn in a drawing pattern formed on the substrate P as described above, a case frequently occurs in which the longitudinal directions of the liquid body discharged regions are different from each other, i.e., the longitudinal directions are orthogonal to each other, in order to efficiently utilize an area of the substrate P.

Now, a case will be exemplified in which patterns to form the color filter 40 and the color filter 70 are drawn on the substrate P by using the carriage 200 when the Y-axis direction is regarded as the main-scanning direction. Further, a liquid body R is assumed to be discharged from the nozzles 21 to 29 of the nozzle group 20R in regions 50R and regions 70R as it should be. The description below is also applicable to the nozzle group 20G and the nozzle group 20B although illustration and description thereof will be omitted.

In this case, as illustrated, nozzles other than the nozzle 23 among the nozzles 21 to 29 can discharge the liquid body R in all the regions 70R overlapped with a scanning trajectory of the nozzles in the color filter 70 with one main-scanning. In contrast, in the color filter 50, since intervals between the regions (i.e., a color pixel pitch) in the alignment direction of the nozzles in the regions 50R, 50G, and 50B are short, a width of the regions 50R becomes narrow. Therefore, the nozzles 21 and 28 among the nozzles 21 to 29 can discharge the liquid body R to the regions 50R, but the nozzles 23 and 26 are hard to discharge the liquid body R to the regions 50R. Accordingly, in the case of the color filter 50, the nozzle head 20 is moved in the X-axis direction, i.e., moved as the sub-scanning, so as to be in a position in which the nozzles are overlapped with the regions 50R in plan view, and then the main-scanning needs to be repeated at each time. This increases the number of main-scannings, thereby taking longer time to complete the drawing.

In such a case, as shown in FIG. 5, the pattern to form the color filter 70 is drawn by using the nozzle head 20 whereas the pattern to form the color filter 50 is drawn by not using the nozzle head 20, but using the nozzle head 40. That is, as illustrated, a nozzle alignment direction of the nozzle groups in the nozzle head 40 is arranged in the Y-axis direction. Therefore, as shown by an outlined arrow in FIG. 5, if the nozzle head 40 is relatively moved with respect to the substrate P in the X-axis direction as the main-scanning direction, one main-scanning enables the nozzles 41 to 49 of the nozzle group 40R to discharge to nearly all the regions 50R overlapped with the main-scanning trajectory of the nozzles, for example. Further, in the color filter 50, the number of main-scannings is prevented from increasing, thereby also providing an advantageous effect that the time taken to complete the drawing is not elongated.

Figure 6:
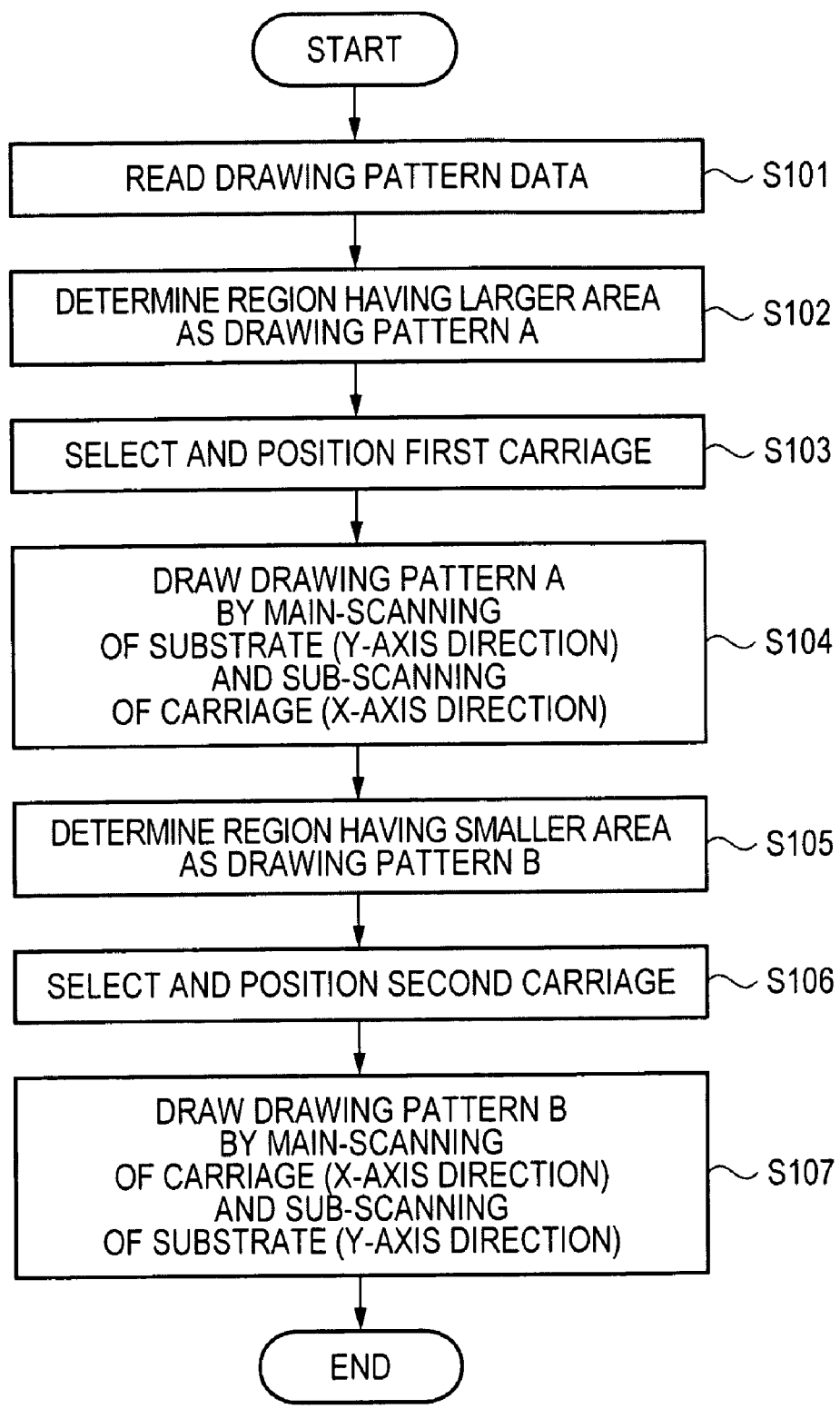
FIG. 6 is a flowchart illustrating processing steps to be conducted by the liquid body discharge device of the embodiment.

Referring now to the flowchart shown in FIG. 6, the drawing process performed by the liquid body discharge device 100 of the embodiment will be described. The procedures of this process are stated in a program software (refer to FIG. 3) stored in the memory 12. The CPU 11 reads and executes the program software.

In a step S101, the drawing pattern data is first read. The drawing pattern data is inputted into the memory 12 of the controller 10 for every substrate P fixed to the stage 105 by suction as shown in FIG. 1. The CPU 11 reads the inputted drawing pattern data. In the embodiment, the drawing pattern data is data for drawing the two pieces of the color filters 50 and one piece of the color filter 70 as shown in FIG. 4.

Then, in a step S102, a region, to which liquid bodies are discharged, having a larger area is determined as a drawing pattern A. The CPU 11 sums up all region areas of the regions 50R, 50G, and 50B, in which the respective color liquid bodies R, G, and B are discharged, for the two pieces of the color filters 50. Likewise, the CPU 11 sums up all region areas of the regions 70R, 70G, and 70B, in which the respective color liquid bodies R, G, and B are discharged, for the color filter 70. Then, the region having a larger area in total is determined as the drawing pattern A. In the embodiment, each region is indicated by coordinate data. The CPU 11 calculates the area of each region based on the coordinate data.

Then, in a step S103, a first carriage is selected and positioned. The CPU 11 selects the carriage 200 provided with the nozzle head 20 having nozzles aligned in the X-axis direction as a first carriage so as to draw a color pattern in R, G, and B to form the color filter 70. Then, the linear motors are driven so as to move the carriage moving stage 112 of the carriage 200 along the guide rails 102, thus positioning the carriage 200 at a calculated drawing start position. In the embodiment, the substrate P is preliminary fixed on the stage 105 by suction so that the longitudinal directions of the drawing pattern regions of the color filter 70 are parallel to the X-axis direction.

Figure 7:
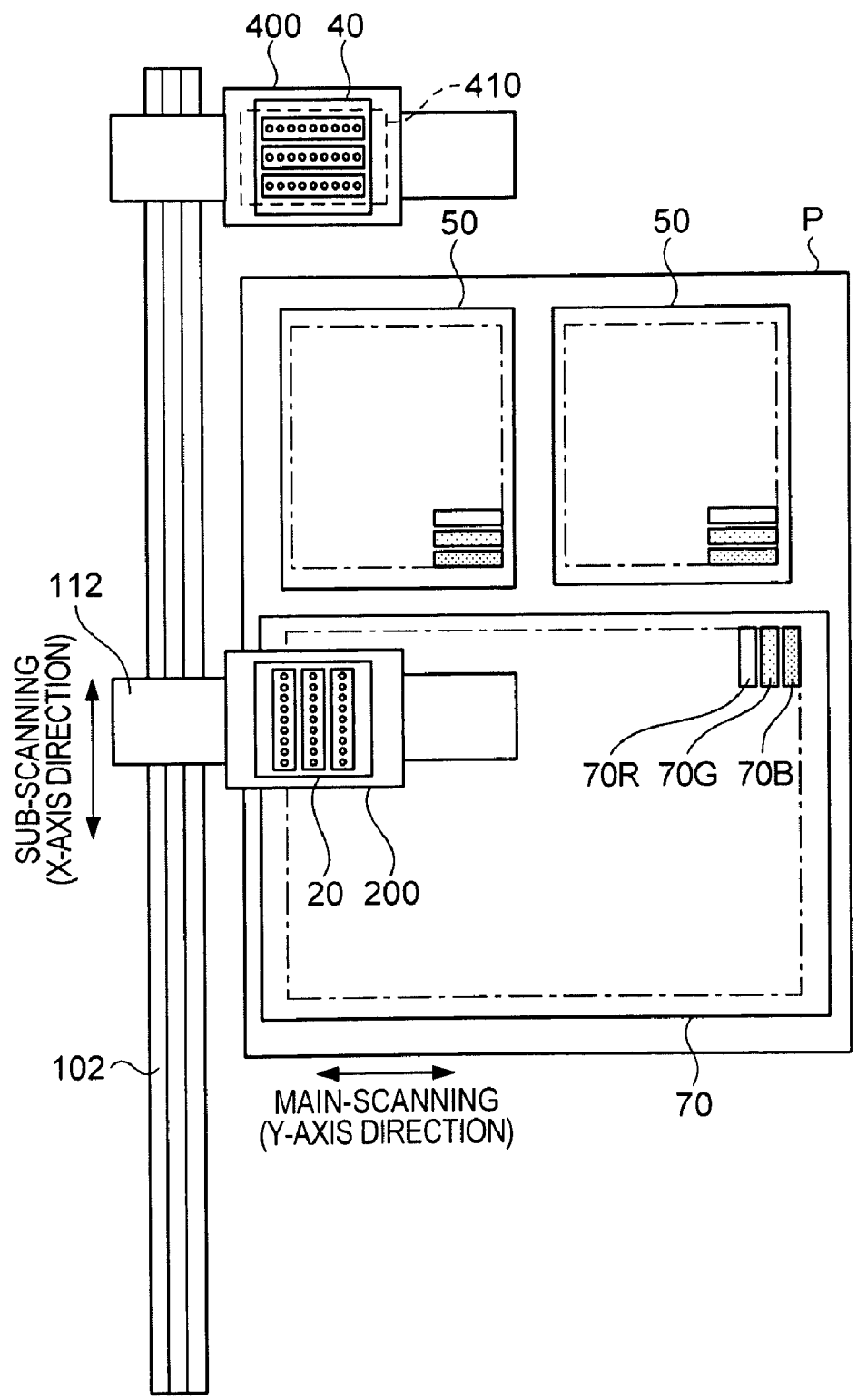
FIG. 7 is a diagram schematically illustrating a state in which a pattern to form a color filter is drawn by a nozzle head.

Next, in a step S104, the substrate P is moved as the main-scanning (in the Y-axis direction) and the carriage is moved as the sub-scanning (in the X-axis direction) so as to draw the drawing pattern A. The process in this step will be explained with reference to FIG. 7. FIG. 7 is a diagram schematically illustrating a state in which the pattern to form the color filter 70 is drawn by the nozzle head 20 provided to the carriage 200 when the substrate P is viewed from the top. One of the pair of guide rails 102 (in the right side in FIG. 7) is omitted so as to avoid complication of the diagram. Here, the nozzle head 20 and the nozzle head 40 are shown in a transparent view.

As illustrated, the substrate P is moved along the pair of guide rails 101 (not illustrated) in the Y-axis direction as the main-scanning. During the main-scanning, the piezoelectric element in the discharge mechanism formed on each of the nozzles of the nozzle head 20 is driven, discharging the color liquid bodies to the regions 70R, 70G, and 70B from the respective nozzles (Only a part thereof is shown in FIG. 7). On the other hand, the carriage 200 is moved along the guide rails 102 in the X-axis direction as the sub-scanning. At each time of the sub-scanning of the carriage 200, the substrate P is repeatedly moved as the main-scanning so that the color liquid bodies are respectively discharged to all of the regions 70R, 70G, and 70G. The drawing pattern A that is the drawing pattern for the color filter 70 is thus drawn.

Here, in the step S104 in the embodiment, the carriage 400 is moved to a position facing to a capping unit 410 provided in an area out of the main-scanning area of the substrate P so as to cover each of the nozzles in the nozzle head 40. The capping unit 410 is a unit to prevent liquid body discharge defects caused by dryness or a viscosity increase of the liquid bodies in the nozzles by covering (capping) the nozzle head. In this way, the liquid bodies in the nozzle head 40 is prevented from drying or increasing viscosity while the pattern of the color filter 70 is drawn by the nozzle head 20. Further, when the liquid bodies need to be discharged again for drawing, the liquid bodies can be always stably discharged from the nozzles.

Referring back to FIG. 6, in a step S105, a region, to which liquid bodies are discharged, having a smaller area is determined as a drawing pattern B. The CPU 11 determines the region having the smaller area in total as the drawing pattern B.

In a step S106, a second carriage is selected and positioned. The CPU 11 selects the carriage 400 provided with the nozzle head 40 having nozzles aligned in the Y-axis direction as the second carriage so as to draw color patterns in R, G, and B on the two pieces of the color filters 50. Then, the linear motors are driven so as to move the carriage moving stage 112 of the carriage 400 along the guide rails 102, thus positioning the carriage 400 at a calculated drawing start position.

Figure 8:
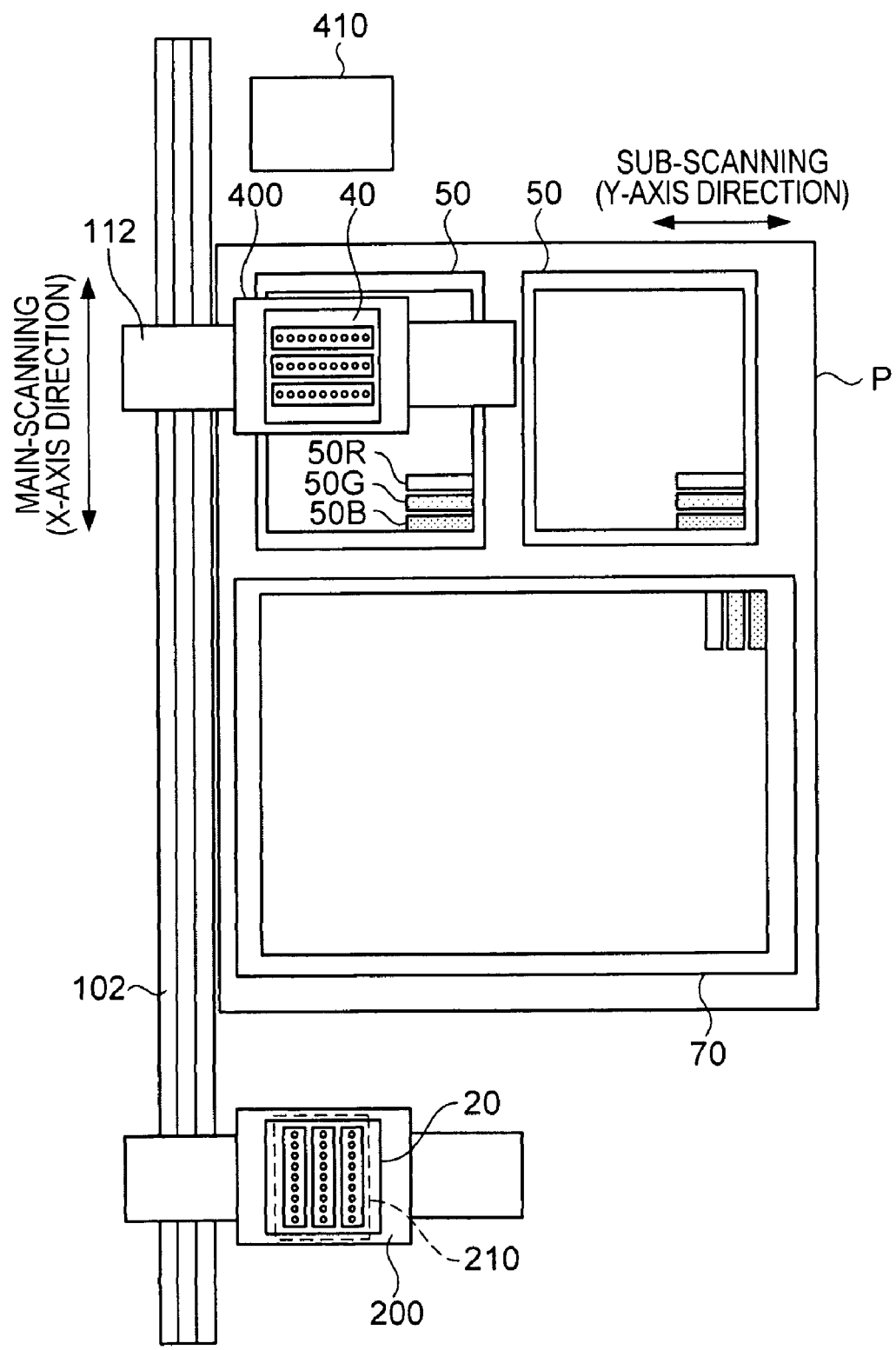
FIG. 8 is a diagram schematically illustrating a state in which a pattern to form another color filter is drawn by a nozzle head.

Next, in a step S107, the carriage is moved as the main-scanning (in the X-axis direction) and the substrate P is moved as the sub-scanning (in the Y-axis direction) so as to draw the drawing pattern B. The process in this step will be explained with reference to FIG. 8. FIG. 8 is a diagram schematically illustrating a state in which the pattern to form the color filter 50 is drawn by the nozzle head 40 provided to the carriage 400 when the substrate P is viewed from the top.

As illustrated, the carriage 400 is moved along the pair of guide rails 102 (one of them is not illustrated) in the X-axis direction as the main-scanning. During the main-scanning, the piezoelectric element in the discharge mechanism formed on each of the nozzles of the nozzle head 40 is driven, discharging the color liquid bodies to the regions 50R, 50G, and 50B from the respective nozzles (Only a part thereof is shown in FIG. 8). On the other hand, the substrate P is moved along the guide rails 101 (not illustrated) in the Y-axis direction as the sub-scanning. At each time of the sub-scanning of the substrate P, the carriage 400 is repeatedly moved as the main-scanning so as to discharge the respective color liquid bodies to all of the regions 50R, 50G, and 50G. The drawing pattern B that is the drawing pattern for the two pieces of the color filters 50 is thus drawn.

Here, in the step S107 in the embodiment, the carriage 200 is moved to a position facing to a capping unit 210 provided in an area out of the main-scanning area at the main-scanning of the substrate P in the step S104 so as to cover each of the nozzles in the nozzle head 20. The capping unit 210 has a unit having the same function as that of the capping unit 410 described above. In this way, the liquid bodies in the nozzle head 20 is prevented from drying or increasing viscosity while the pattern of the color filter 50 is drawn by the nozzle head 40. Further, when the liquid bodies need to be discharged again for drawing, the liquid bodies can be always stably discharged from the nozzles.

Accordingly, through the steps S101 to S107, the liquid body discharge device 100 of the embodiment can respectively draw the patterns of the color filters 70 and 50 having different longitudinal directions and used for different sized screens by using the carriages 200 and 400. The carriages 200 and 400 each having nozzles that are aligned in different directions from each other move along the pair of the guide rails so as to draw the patterns of the color filters 70 and 50.

Therefore, a rotating mechanism for rotating the alignment direction of the nozzles is not necessarily formed in the nozzle head, thus avoiding the carriage being heavy due to the rotating mechanism and preventing replacement of the nozzle head from being complicated. Further, since variation of the nozzle positions caused by the rotating mechanism unlikely occurs, the liquid bodies are discharged at desired positions.

In the embodiment, it is set that the area of the liquid body discharged regions to which the liquid bodies are discharged by the main-scanning of the carriage is smaller than the area of the liquid body discharged regions to which the liquid bodies are discharged by the main-scanning of the substrate. This is due to the following reasons. That is, the nozzle head may be provided with structures such as a liquid body tank and a liquid body supplying mechanism other than the discharge mechanism described above. In such a case, the nozzle head may gain a considerable amount of weight. This may make a moving speed of the carriage slower than a moving speed of the substrate. In another case, the movement of the carriage likely causes a vibration to the nozzle head. As a result, the movement of the nozzle head has a higher possibility to worsen accuracy of a liquid body discharge position in the liquid body discharged regions compared with the movement of the substrate, and thus the moving speed of the carriage needs to be made slower than that of the substrate. In consideration of the case as above, in the embodiment, the area of the liquid body discharged regions to which the liquid bodies are discharged by the main-scanning of the carriage is made smaller than the area of the liquid body discharged regions to which the liquid bodies are discharged by the main-scanning of the substrate so as to reduce a moving amount of the carriage. This can minimize a total scanning time required for drawing all the patterns. However, this may not be necessarily performed. In contrast to this, for example, in a case where the moving speed of the carriage is faster than the moving speed of the substrate, it is preferable that the substrate P be disposed by suction and subjected to drawing in advance so as to make the area of the liquid body discharged regions to which the liquid bodies are discharged by the main-scanning of the carriage larger than the area of the liquid body discharged regions to which the liquid bodies are discharged by the main-scanning of the substrate P.

It should be understood that the invention is not limited to the above-mentioned embodiment, and various changes can be made without departing from the spirit and scope of the invention. Hereinafter, modifications will be described.

First Modification

In the embodiment described above, the liquid body discharge device 100 includes each one of the carriage 200 having the nozzles aligned in the X-axis direction and the carriage 400 having the nozzles aligned in the Y-axis direction that is orthogonal to the X-axis direction. However, needless to say, the invention is not limited to this. For example, the liquid body discharge device 100 may include a plurality of carriages 200 or a plurality of carriages 400. Further, the liquid body discharge device 100 may include the plurality of both carriages 200 and 400 at the same time.

Figure 9:
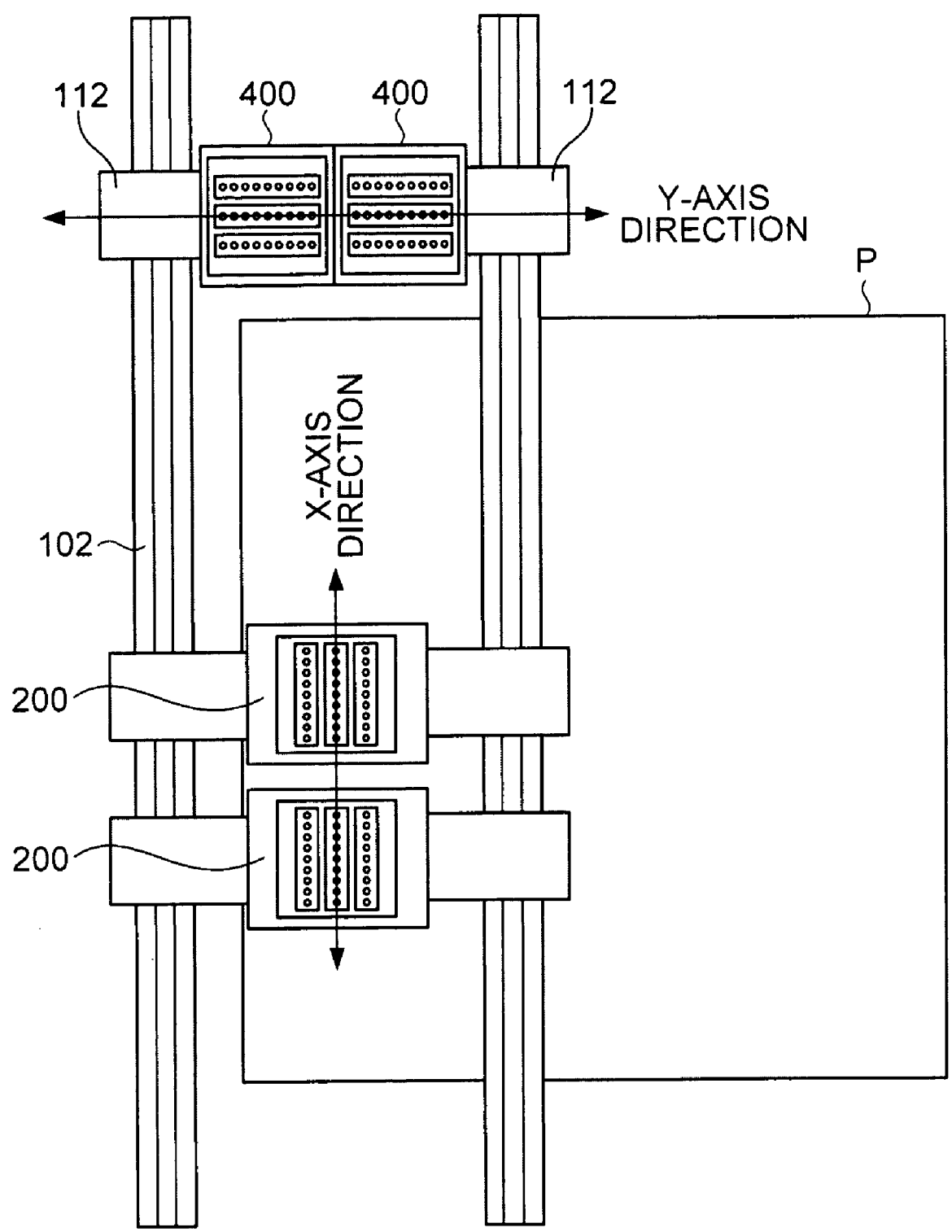
FIG. 9 is a diagram explaining positions of carriages in a case of employing a plurality of carriages according to a first modification.

A case where a liquid body discharge device includes two pieces of the carriages 200 and two pieces of the carriages 400 is shown in FIG. 9 as an example. FIG. 9 is a diagram schematically illustrating an arrangement of the carriages 200 and 400 when the substrate P is viewed from the top. Here, nozzle heads of the carriages 200 and 400 are shown in a transparent view.

As illustrated, in a case where the plurality of carriages 200 and the plurality of carriages 400 are provided, it is preferable that the carriages 200 be apposed in the X-axis direction and the carriages 400 be apposed in the Y-axis direction. In this way, as it is clear in the description with reference to FIGS. 4 and 5 in the embodiment above, when the plurality of carriages 200 that are apposed are relatively moved in the Y-axis direction with respect to the substrate P as the substrate P moves in the Y-axis direction, a width of the liquid body discharged regions to which the liquid bodies are discharged from the nozzles is widened. Further, when the plurality of carriages 400 which are apposed are moved in the X-axis direction, a width of the liquid body discharged regions to which the liquid bodies are discharged from the nozzles is widened. As a result, an area of the liquid body discharged regions to which the liquid bodies are discharged from the nozzles with one time main-scanning is enlarged, thereby reducing the number of scannings required for discharging the liquid bodies to all the regions.

In the first modification, when the liquid body discharge device 100 includes the plurality of carriages 400, it is preferable that all the plurality of carriages 400 be concurrently moved by the carriage moving stage 112. This can suppress an increase of the number of the guide rails 102 and the number of the carriage moving stages 112, thereby preventing the liquid body discharge device 100 from being complicated in configuration and preventing a manufacturing cost from increasing.

Second Modification

In the embodiment described above, the nozzle groups (20R, 20G, and 20B) formed in the nozzle head 20 are arranged in the X-axis direction and the nozzle groups (40R, 40G, and 40B) formed in the nozzle head 40 are arranged in the Y-axis direction that is orthogonal to the X-axis direction. However, needless to say, the invention is not limited to this. For example, the nozzle groups may be inclined at θ degrees with respect to the X-axis direction or the Y-axis direction.

Figure 10:
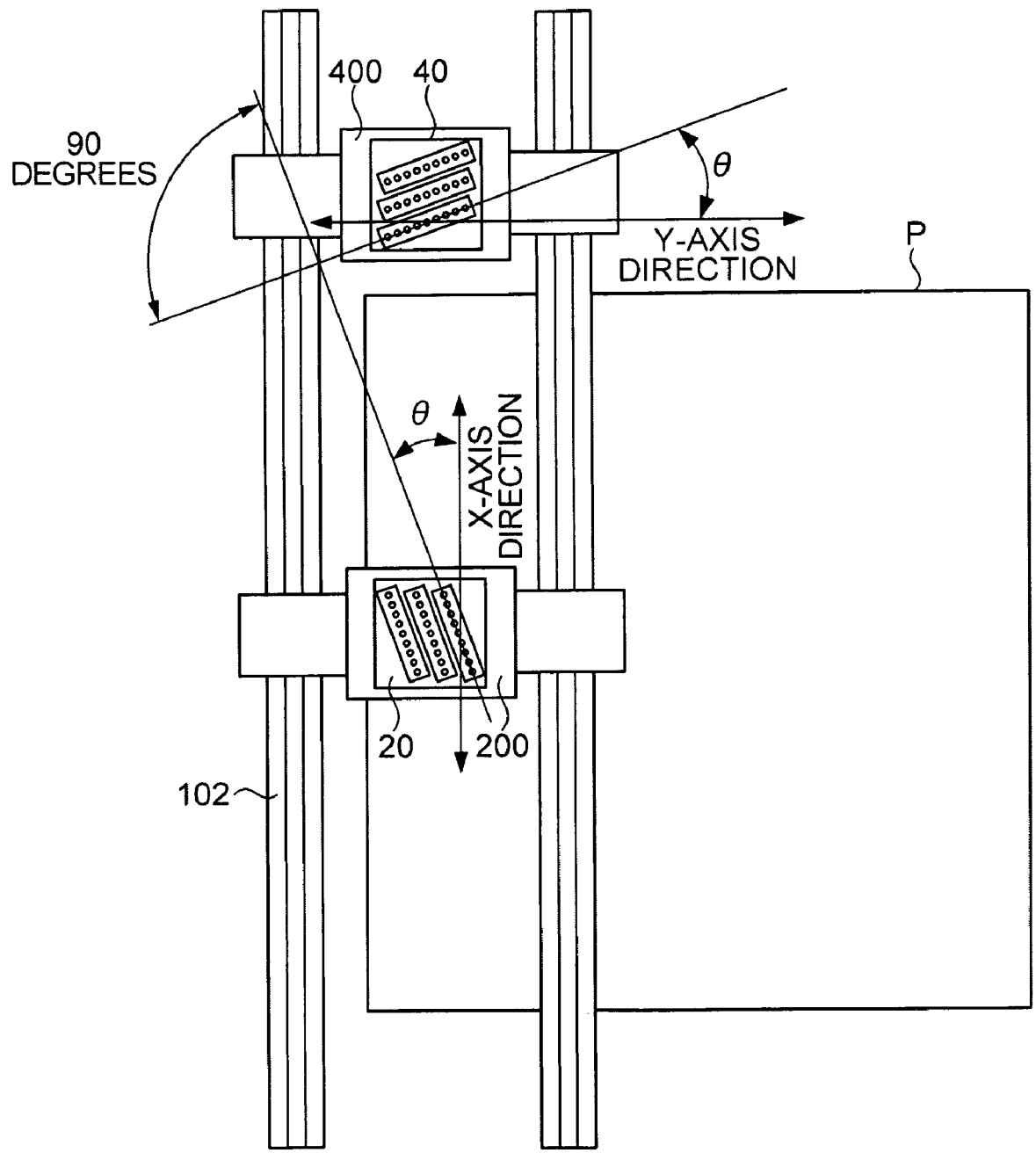
FIG. 10 is a diagram schematically illustrating a state in which an alignment direction of nozzles is inclined according to a second modification.

The second modification will be described with reference to FIG. 10. FIG. 10 is a diagram schematically illustrating the carriages 200 and 400 viewed from the top. Here, the nozzle head 20 and the nozzle head 40 are shown in a transparent view.

In the second modification, the nozzle groups formed in the nozzle head 20 of the carriage 200 are arranged so as to be inclined at θ degrees in a counterclockwise direction with respect to the X-axis direction, as illustrated. Likewise, the nozzle groups formed in the nozzle head 40 of the carriage 400 are arranged so as to be inclined at θ degrees in a counterclockwise direction with respect to the Y-axis direction. In this case, a nozzle pitch of the nozzle groups are narrowed in the direction orthogonal to the main-scanning direction. Therefore, although the width of the liquid body discharged regions to which the liquid bodies are discharged from the nozzles at the main-scanning is narrowed, the number of the nozzles that can discharge the liquid bodies to the liquid body discharged regions is increased. As a result, the number of the liquid body discharged regions to which the liquid bodies cannot be discharged from the nozzles with one time main-scanning is reduced, thereby it can be expected to reduce the number of the main-scannings required for discharging the liquid body to all the liquid body discharged regions.

Further, in the modification, the nozzle head 40 can concurrently perform drawing at the main-scanning of the substrate P. In this case, both the nozzle heads having the nozzles aligned in a nearly orthogonal relation to each other are used, increasing possibility of existence of the nozzles having a preferable alignment direction depending on a shape of the liquid discharged regions. As a result, an increase of the number of the liquid body discharged regions to which the liquid bodies can be discharged with one time main-scanning can be expected.

In the second modification, the direction in which the nozzle groups are arranged in the nozzle head 20 and the direction in which the nozzle groups are arranged in the nozzle head 40 are inclined at the same angle, that is, θ degrees, in the counterclockwise direction. However, needless to say, the nozzle heads 20 and 40 may be inclined at different angles or in different directions from each other. Based on a shape of the drawing pattern to be formed on the substrate P, inclination of each of the nozzle groups can be set so as to have a preferable value of the nozzle pitch.

Third Modification

In the embodiment, the X-axis direction and the Y-axis direction are orthogonal to each other, that is, the main-scanning direction and the sub-scanning direction are orthogonal to each other, but not limited to this. Therefore, the X-axis direction and the Y-axis direction may not be orthogonal to each other. The liquid discharged regions are typically in a rectangular shape having sides that are orthogonal to each other in most cases. Therefore, the X-axis direction and the Y-axis direction are orthogonal to each other in the embodiment above. However, in a case where the liquid discharged regions are not in a rectangular shape, the X-axis direction or the Y-axis direction is preferably changed in accordance with the shape of the liquid discharged regions as this has a higher possibility of increasing the liquid discharged regions that can be drawn with one time main-scanning.

Figure 11:
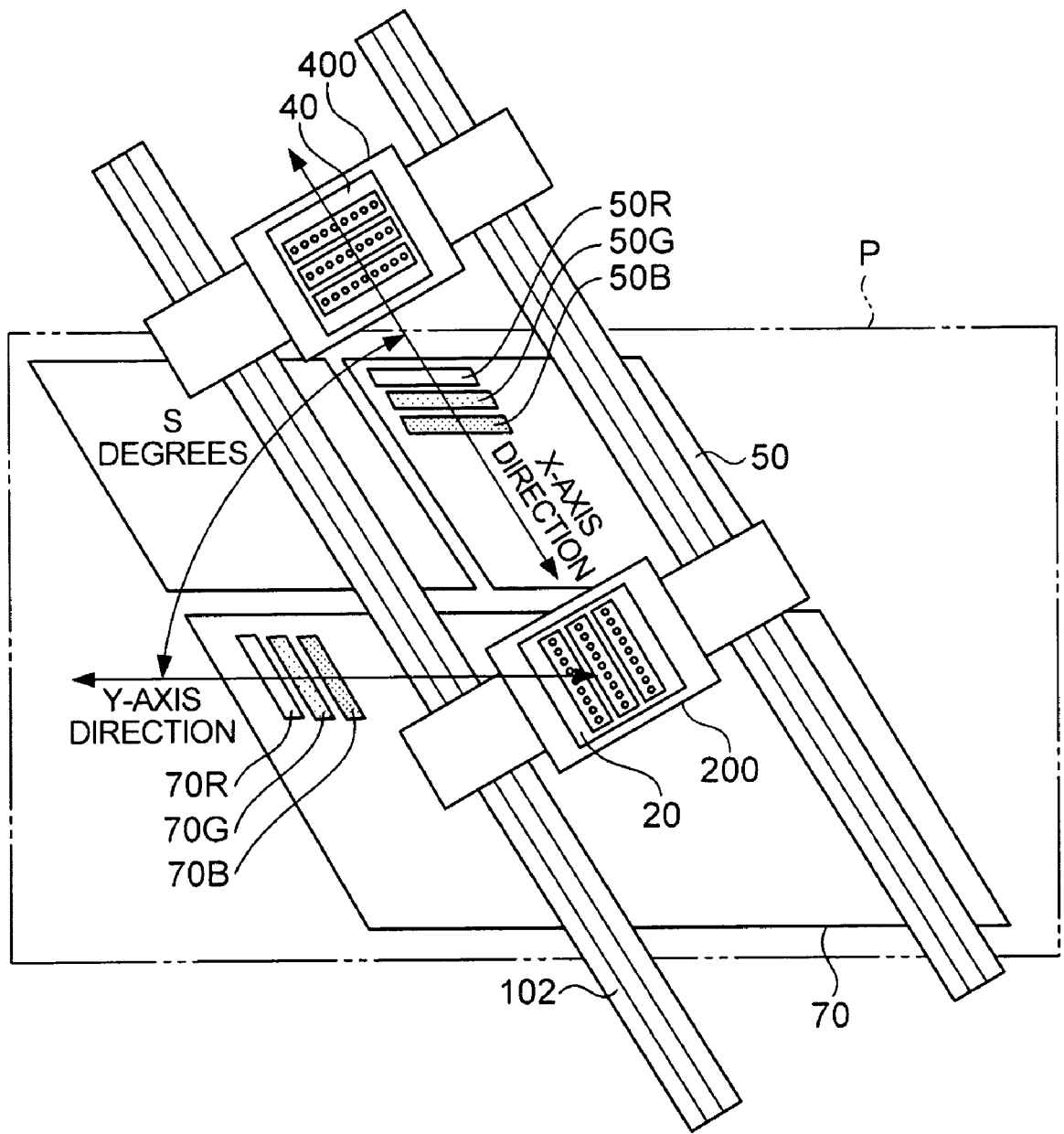
FIG. 11 is a diagram schematically illustrating a state in which a direction to move carriages is inclined according to a third modification.

The third modification will be described with an example, with reference to FIG. 11. FIG. 11 is a diagram schematically illustrating the carriages 200 and 400 viewed from the top. Here, the nozzle head 20 and the nozzle head 40 are shown in a transparent view. As illustrated, the color filter 50 and the color filter 70 are in a parallelogram shape. Each of the liquid body discharged regions 50R, 50G, and 50B and each of the liquid body discharged regions 70R, 70G, and 70B, to which the respective color liquid bodies are discharged, is also in a parallelogram shape. Further, the liquid body discharged regions 50R, 50G, and 50B are arranged along an oblique side of the parallelogram while the liquid body discharged regions 70R, 70G, and 70B are arranged along a bottom of the parallelogram in the Y-axis direction.

In the third modification, at least the moving direction of the carriage 400 along the guide rails 102 is inclined at S degrees in a clockwise direction with respect to the Y-axis direction so that the X-axis direction in which the nozzle head 40 is moved is parallel to the oblique side of the parallelogram that is the shape of the color filter 50. In this case, for forming the color filter 50, the nozzle head 40 provided to the carriage 400 moving along the guide rails 102 is moved as the main-scanning in a direction in which the liquid body discharged regions 50R, 50G, and 50B are arranged. For forming the color filter 70, the nozzle head 20 provided to the carriage 200 is relatively moved with respect to the substrate P as the main-scanning in a direction in which the liquid body discharged regions 70R, 70G, and 70B are arranged in accordance with the main-scanning of the substrate P in the Y-axis direction. Therefore, an increase of the liquid body discharged regions to which the liquid bodies can be discharged from the nozzles with one time main-scanning can be expected. As a result, the time taken to complete all the drawing patterns can be shortened.

In the third modification, the nozzle head 20 provided to the carriage 200 includes the nozzles aligned in the same direction as the longitudinal direction of the liquid body discharged regions 70R, 70G, and 70B of the parallelogram shape as shown in FIG. 11, but this may not be always required. For example, the nozzles may be aligned in the direction orthogonal to the Y-axis direction that is the main-scanning direction. According to this, the increase of the liquid body discharged regions to which the color liquid bodies can be discharged from the nozzles with one time main-scanning can be expected as described above.

Other Modifications

In the embodiment above, the substrate P is preliminary fixed on the stage 105 by suction so that the longitudinal direction of the liquid body discharged regions in the color filter 70 for the large sized screen is the X-axis direction. The total area of the liquid body discharged regions in the one color filter 70 is larger than the total area of the liquid body discharged regions of the two pieces of the color filters 50. Therefore, in the process flowchart shown in FIG. 6, the carriages to be used in respective main-scanning directions are selected based on the size of the total area of the liquid body discharged regions. However, needless to say, it is not limited to this. For example, the longitudinal direction of the liquid body discharged regions included in each of the color filters formed on the substrate P is calculated from the drawing pattern data, and then, a carriage provided with a nozzle head having nozzles aligned in a direction closest to the longitudinal direction may be selected. This allows the liquid bodies to be discharged from the nozzles aligned in a preferable direction corresponding to the shape of each of the liquid body discharged regions in the color filter 70 regardless of the total area of the liquid body discharged regions in each of the color filters to be formed on the substrate P.

In the embodiment above, the substrate P is moved in the Y-axis direction as the main-scanning while the carriage 400 is moved in the X-axis direction as the main-scanning. However, it is not particularly limited to this, thus needless to say, the carriage 400 may be moved in the Y-axis direction as the main-scanning while the substrate P is moved in the X-axis direction as the main-scanning. The point is that the nozzles and the liquid body discharged regions are configured so as to relatively move in the main-scanning movement. In this case, configurations of the guide rails 101 and 102, the movable stage 103, and the carriage moving stage 112 obviously need to be changed from those in the embodiment.

Further, in the embodiment above, the movable stage 103 and the carriage moving stage 112 are moved by a moving unit including the air sliders and the linear motors provided inside the guide rails 101 and 102. However, it is not particularly limited to this, and thus a moving unit including a motor and a belt, or a moving unit including a ball screw and a motor may also be employed. In other words, any configuration is applicable by which the movable stage 103 and the carriage moving stage 112 can be moved.

In the embodiment above, the color pixels formed in the color filter 50 or the color filter 70 are arranged in the stripe arrangement in which the color pixels of the same color are consecutively formed in the longitudinal direction of the color pixels. However, it is not limited to this, and thus they may be arranged in a delta arrangement, or a mosaic arrangement. Further, the number of colors of the color filters is 3 colors of R, G, and B. However, it is not limited to this, the number of the colors may be increased to four colors or decreased to 2 colors, for example. Furthermore, the color pixels in the color filter 50 and the color pixels in the color filter 70 may be the same in shape, or may be different from each other in size or shape.

Further, in the embodiment above, the liquid body discharge device 100 that discharges color liquid bodies on a glass substrate so as to form a color filter is described as a liquid body discharge device. However, needless to say, it is not limited to this. For example, the invention may be practiced with a manufacturing device to form a metal wiring pattern by discharging a functional liquid including a metal material on a silicon substrate, a ceramic substrate, or a resin substrate, other than the glass substrate, or with a device for manufacturing an organic EL element to form a light emitting element by discharging a functional liquid including a light-emitting material made of an organic material as a solute on a liquid body discharged region. In other words, the invention can be similarly practiced by any device as long as the device can record a pattern such as an image or a graphic, or a letter on a liquid body discharged object such as a substrate by discharging a functional liquid using a method for discharging a liquid body.

The entire disclosure of Japanese Patent Application No. 2008-11213, filed Jan. 22, 2008 is expressly incorporated by reference herein.

What is claimed is:

1. A liquid body discharge device, comprising:
a first carriage having a first plurality of nozzles for discharging a liquid body to a liquid body discharged region of a substrate, the plurality of nozzles being aligned in a first alignment direction;
a second carriage having a second plurality of nozzles for discharging a liquid body to a liquid body discharged region of a substrate, the second plurality of nozzles being aligned in a second alignment direction that is different from the first alignment direction; and
a linear guide rail,
wherein the first carriage and the second carriage are each mounted to and move along the guide rail; and
wherein the first plurality of nozzles is oriented at an angle θ relative to an x-axis, and the second plurality of nozzles is oriented at the angle θ relative to a y-axis.

2. The liquid body discharge device according to claim 1, wherein the first alignment direction and the second alignment direction are substantially orthogonal to each other.

3. The liquid body discharge device according to claim 1, wherein the first carriage and the second carriage are independently movable along the guide rail.

\* \* \* \* \*